United States Patent
Takai et al.

(10) Patent No.: US 10,218,533 B2
(45) Date of Patent: *Feb. 26, 2019

(54) WIRELESS DEVICE AND INTERFACE MODULE

(71) Applicant: YOKOGAWA ELECTRIC CORPORATION, Musashino-shi, Tokyo (JP)

(72) Inventors: Kiyoshi Takai, Tokyo (JP); Masato Yamaji, Tokyo (JP); Tetsuo Inagaki, Tokyo (JP); Hitoshi Saito, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/786,683

(22) PCT Filed: Mar. 18, 2014

(86) PCT No.: PCT/JP2014/057320
§ 371 (c)(1),
(2) Date: Oct. 23, 2015

(87) PCT Pub. No.: WO2014/188769
PCT Pub. Date: Nov. 27, 2014

(65) Prior Publication Data
US 2016/0087813 A1   Mar. 24, 2016

(30) Foreign Application Priority Data
May 20, 2013  (JP) ................................. 2013-106466

(51) Int. Cl.
*H04L 12/28* (2006.01)
*H04Q 9/00* (2006.01)
*H04L 29/06* (2006.01)

(52) U.S. Cl.
CPC .......... *H04L 12/2836* (2013.01); *H04L 69/08* (2013.01); *H04Q 9/00* (2013.01);
(Continued)

(58) Field of Classification Search
CPC ................. H04L 12/2836; H04L 69/08; H04L 2012/4026; H04Q 9/00; H04Q 2209/40; H04Q 2209/80; H04Q 2209/883
See application file for complete search history.

(56) References Cited

U.S. PATENT DOCUMENTS 8,188,264 B2   5/2012 Addepalli et al.
8,818,264 B2   8/2014 Yen et al.
(Continued)

FOREIGN PATENT DOCUMENTS

CN   101421983 A   4/2009
CN   101715591 A   5/2010
(Continued)

OTHER PUBLICATIONS

An Office Action dated Aug. 12, 2016, which issued during the prosecution of U.S. Appl. No. 14/062,546.
(Continued)

*Primary Examiner* — Scott M Sciacca
(74) *Attorney, Agent, or Firm* — Sughrue Mion, PLLC

(57) ABSTRACT

An interface module according to one aspect of the invention includes an interface and a local communication device. The interface, which is connected to a field device, receives a first wireless signal from the field device. The local communication device wirelessly transmits the first signal to a wireless module by first local communications. The local communication device receives, from the wireless module by second local communications, a second signal destined for the field device that is wirelessly transmitted from an external device and wirelessly received by the wireless
(Continued)

device. The interface device outputs the second signal to the field device.

11 Claims, 8 Drawing Sheets

(52) U.S. Cl.
CPC .. *H04L 2012/2841* (2013.01); *H04Q 2209/43* (2013.01); *H04Q 2209/883* (2013.01)

(56) References Cited

U.S. PATENT DOCUMENTS

| | | |
|---|---|---|
| 2001/0016891 A1 | 8/2001 | Hagino |
| 2003/0129944 A1 | 7/2003 | Chang et al. |
| 2004/0260405 A1 | 12/2004 | Eddie et al. |
| 2005/0047356 A1* | 3/2005 | Fujii .................... G06F 1/3209 370/311 |
| 2005/0136909 A1 | 6/2005 | Eguchi |
| 2007/0243830 A1 | 10/2007 | Isenmann et al. |
| 2007/0294361 A1* | 12/2007 | Arzig ................ G05B 19/0428 709/208 |
| 2008/0034864 A1 | 2/2008 | Wittmer |
| 2008/0211664 A1 | 9/2008 | Griech et al. |
| 2008/0294915 A1* | 11/2008 | Juillerat .................. G06F 1/266 713/300 |
| 2009/0112373 A1* | 4/2009 | Feldman ............... G06F 1/3203 700/286 |
| 2009/0171163 A1 | 7/2009 | Mates et al. |
| 2009/0174570 A1 | 7/2009 | Hagg |
| 2010/0161081 A1* | 6/2010 | Seiler ................ G05B 19/0423 700/12 |
| 2010/0217108 A1 | 8/2010 | Tauber et al. |
| 2010/0298957 A1 | 11/2010 | Sanchez Rocha et al. |
| 2011/0022851 A1 | 1/2011 | Yokota et al. |
| 2011/0153040 A1 | 6/2011 | Wittmer et al. |
| 2011/0212690 A1 | 9/2011 | White et al. |
| 2012/0051211 A1* | 3/2012 | Budampati ......... H04L 41/0659 370/217 |
| 2012/0236768 A1* | 9/2012 | Kolavennu ......... H04W 76/023 370/310 |
| 2012/0236769 A1* | 9/2012 | Powell ............... G05B 19/0426 370/310 |
| 2013/0025115 A1 | 1/2013 | Stormbom |
| 2013/0028300 A1 | 1/2013 | Alberth et al. |
| 2013/0107919 A1* | 5/2013 | Burns ..................... H03K 7/06 375/219 |
| 2014/0106687 A1 | 4/2014 | Allgaier |
| 2014/0126391 A1* | 5/2014 | Liu ................... H04W 52/0206 370/252 |
| 2014/0126442 A1* | 5/2014 | Jafarian ............ H04W 52/0212 370/311 |
| 2014/0172121 A1* | 6/2014 | Li .......................... G05B 15/02 700/12 |
| 2014/0321443 A1* | 10/2014 | Samudrala ............ H04J 3/1694 370/337 |
| 2015/0182461 A1 | 7/2015 | Kim et al. |
| 2015/0182961 A1 | 7/2015 | Arnold et al. |
| 2017/0331286 A1* | 11/2017 | Sinreich ................. H02J 7/345 |

FOREIGN PATENT DOCUMENTS

| | | |
|---|---|---|
| EP | 1223057 A2 | 7/2002 |
| EP | 1600736 A1 | 11/2005 |
| EP | 1757480 A1 | 2/2007 |
| EP | 2403301 A2 | 1/2012 |
| EP | 2276395 B1 | 8/2014 |
| JP | 09-134492 A | 5/1997 |
| JP | 2000295792 A | 10/2000 |
| JP | 2001236103 A | 8/2001 |
| JP | 2002-185549 A | 6/2002 |
| JP | 2002-209023 A | 7/2002 |
| JP | 200378939 A | 3/2003 |
| JP | 2007048195 A | 2/2007 |
| JP | 2007174145 A | 7/2007 |
| JP | 2008-500659 A | 1/2008 |
| JP | 2008129770 A | 6/2008 |
| JP | 2008219512 A | 9/2008 |
| JP | 2009-290718 A | 12/2009 |
| JP | 2010277503 A | 12/2010 |
| JP | 2010541385 A | 12/2010 |
| JP | 2012109944 A | 6/2012 |
| WO | 2005031339 A1 | 4/2005 |
| WO | 2005/116787 A1 | 12/2005 |
| WO | 2008153332 A1 | 12/2008 |
| WO | 2009075919 A2 | 6/2009 |
| WO | 2009119079 A1 | 10/2009 |
| WO | 2009127954 A2 | 10/2009 |
| WO | 2010047621 A2 | 4/2010 |
| WO | 2012/129064 A1 | 9/2012 |

OTHER PUBLICATIONS

Shuji Yamamoto et al. "World's First Wireless Field Instruments Based on ISA100.11a", Yokogawa Technical Report English Edition, 2010, pp. 13-16, vol. 53, No. 2.

* cited by examiner

WIRELESS DEVICE AND INTERFACE MODULE

CROSS REFERENCE TO RELATED APPLICATIONS

This is a National Stage of International Application No. PCT/JP2014/057320 filed Mar. 18, 2014, claiming priority based on Japanese Patent Application No. 2013-106466 filed May 20, 2013, the contents of all of which are incorporated herein by reference in their entirety.

TECHNICAL FIELD

The present invention relates to wireless devices and interface modules.

This application claims priority from Japanese Patent Application No. 2013-106466, filed May 20, 2013; the entire contents of which are incorporated herein by reference.

BACKGROUND ART

Conventionally, in a plant, a factory, etc., to realize a sophisticated automatic operation, distributed control systems (DCS) in which a field device (a measurement device, an operation device) and a control apparatus which performs control thereof are connected via a communications device are being built. While most field devices which configure such distributed control systems performs wired communications, devices for conducting wireless communications which are compliant with industrial wireless communications standards such as ISA100.11a, Wireless HART (registered trademark), etc., (wireless field device) are also being realized in recent years.

In a housing of the above-described wireless field device are generally included an input/output device which performs measurement or operation of the state amount (for example, pressure, temperature, flow amount, etc.) in an industrial process, a wireless communications device which conducts wireless communications in compliance with the above-described industrial wireless communications standards, and a control device which controls and manages an operation of the wireless field device, the respective devices being operated with power supplied from a single power supply. Here, it is not necessary to connect the wireless field device to a communications line or a communications bus like a conventional field device and the wireless field device is basically installed solely in the plant, etc., so that most of the wireless field device has a battery embedded as the above-described single power supply.

Patent document 1 below discloses a wireless device which is installed in a conventional field device not having the wireless communications device to operate the conventional field device as the above-described wireless field device. More specifically, the wireless device disclosed in Patent document 1 below includes an interface connected to the conventional field device, a wireless communications device which conducts wireless communications, and a power supply device which supplies power to the conventional field device via the interface. When a signal from the field device is input via the interface device, this wireless device transmits the signal from the wireless communications device to a transmission destination (for example, an upper-level controller), and, when a signal destined for the field device is received in the wireless communications device, it outputs the signal received via the interface device to the field device.

CITATION LIST

[PATENT DOCUMENT 1] U.S. Patent Application Publication No. 2008/0211664

DISCLOSURE OF THE INVENTION

Technical Problem

Now, the wireless device which is disclosed in the above-mentioned Patent document 1 is configured such that the interface connected to a field device to conduct communications with the field device, and a wireless communications device which conducts wireless communications with an external device are integrated. Therefore, the wireless device disclosed in the above-described Patent document 1 has problems indicated in (1) to (3) below.

(1) Design is Necessary for Each Communications Protocol Used in a Field Device

The interface provided in the wireless device is for conducting communications with the field communications device as described above, so that a communications protocol used in the interface of the wireless device needs to be adapted to a communications protocol (a communications protocol used in two-wire communications such as HART (registered trademark), BRAIN, etc., for example) used in the field device. When the communications protocol used in the interface of the wireless device is not adapted to the communications protocol used in the field device, the whole of the wireless device needs to be redesigned to adapt to the communications protocol used in the field device.

(2) Device Authentication is Necessary for Each Type of Wireless Device

The wireless device which conducts communications wirelessly needs to receive authentication (wireless standards authentication) that it is generally adapted to laws of the respective countries. This wireless standards authentication basically needs to be received for each type of wireless device, so that, for example, the respective wireless device which differs in the type or shape of the interface even when the wireless communications device is the same needs to receive wireless standards authentication. As this wireless standards authentication needs to be received individually by country or region, when a manufacturer or a vendor of the wireless device seeks to deploy business worldwide, significant time, cost, and manpower are needed.

(3) Degree of Freedom in Installing the Wireless Device is Low and Stable Communications Becomes Difficult Most of the wireless devices are installed near the field device. This is for the reason that the installation works for conduit for protecting a connection line which connects the wireless device and the field device are omitted to suppress an occurrence of cost. However, the field device is often installed in an environment in which reflection or shielding of waves is likely to occur with a large number of installations of pipes and production facilities, etc., so that, in a wireless communications device in which the interface and the wireless communications device are integrated, stable wireless communications may become difficult.

Here, when an antenna can be separated from a wireless communications device using an antenna cable, for example, stable wireless communications can be made possible since the degree of freedom of the location of installing the antenna is increased. However, there is a limit to the extendable cable length due to the effect of noise and loss of the antenna cable, so it is not necessarily the case that the stable wireless communications are realized.

In light of the circumstances as described above, an object of the present invention is to provide a wireless device and an interface module which may reduce redesign and device authentication as much as possible and which also makes it possible to realize stable wireless communications regardless of the location of installing a field device.

Technical Solution

A wireless device according to one aspect of the invention includes an interface module and a wireless module. The interface module includes an interface and a first local communications device. The wireless module includes a second local communications device and a wireless communications device. The interface is connected to the field device and receives a first signal output from the field device. The first local communication device transmits the first signal to the wireless module by first local communications. The second local communication device receives the first signal from the first local communications device by the first local communications. The wireless communications device wirelessly receives a second signal destined for the field device from a second external device. The second local communications device transmits the second signal to the first local communications device by second local communications, and the interface outputs the second signal to the field device.

According to the one aspect, the first signal output from the field device to the interface module is output to the wireless module via the first and second local communications device to be wirelessly transmitted from the wireless communications device of the wireless module to the first external device. On the other hand, the second signal destined for the field device transmitted from the second external device is received in the wireless communications device of the wireless module, after which it is output to the interface module via the second and first local communications devices and output to the field device from the interface module.

Moreover, in the above-described wireless device, at least one of the interface module and the wireless module includes a power supply which supplies power to at least one of the field device, the interface module, and the wireless module, or a power supply terminal which receives supply of power from the power supply or an external power supply.

Furthermore, the above-described wireless device further includes a first connection which connects the interface module and the wireless module. In this case, the power is supplied via the first connection.

Alternatively, the wireless device further includes a second connection which connects the interface module and the wireless module. In this case, the first local communications and the second local communications are conducted via the second connection, and the power is supplied via the second connection.

Moreover, in the above-described wireless device, the wireless module may further include a first controller which sets the interface module out of the sleep state. In this case, when the interface module is set out of the sleep state by the first controller, it performs supplying of power to the field device to conduct communications with the field device.

Furthermore, in the above-described wireless device, the wireless module may further include a second controller which sets the wireless module out of the sleep state. In this case, when the wireless module is set out of the sleep state of the wireless module by the second controller, it wirelessly transmits the first signal to the first external device.

Moreover, in the above-described wireless device, the second controller sets the wireless module out of the sleep state prior to the second external device transmitting the second signal using schedule information indicating a timing at which a wireless signal is transmitted by the second external device.

Furthermore, in the above-described wireless device, the interface module further includes a first housing (C1) which accommodates at least the interface and the first local communications device. Moreover, the wireless module further includes a second housing (C2) which houses at least the second local communications device and the wireless communications device.

Moreover, in the above-described wireless device, either one of the interface module and the wireless module is at least one of: a display device which displays the state of the field device, the interface module, and the wireless module; and a setting device which performs setting to the field device, the interface module, and the wireless module.

An interface module according to another one aspect of the invention includes an interface and a local communications device. The interface is connected to the field device and receives a first signal from the field device. The local communications device transmits the first signal by first local communications to a wireless module. The local communications device receives, by second local communications, a second signal destined for the field device that is wirelessly transmitted from an external device and wirelessly received by the wireless module. The interface outputs the second signal to the field device.

Moreover, the interface module may further include a power supply which supplies power to at least one of the field device, the interface module, and the wireless module; or a power supply terminal which receives supply of power from the power supply or an external power supply.

Furthermore, the interface module further includes a controller which sets the wireless module out of the sleep state prior to the external device transmitting the second signal using schedule information indicating a timing at which the external device transmits the second signal.

Moreover, the interface module further includes a housing which accommodates at least the interface and the first local communications device.

Furthermore, the interface module further includes a display device which displays the state of the field device, the interface module, and the wireless module; and a setting device which performs setting to the field device, the interface module, and the wireless module.

Moreover, the interface module further includes a controller which cause the interface to be brought to an active state when a third signal for causing the interface to be brought to the active state is received from the wireless module, and which causes the interface to be brought to a sleep state when the first signal is accepted from the field device.

Effects of the Invention

According to an aspect of the present invention, this yields an advantage of making it possible to reduce redesign and device authentication of the wireless device. Moreover,

MODE FOR CARRYING OUT THE INVENTION

Below, a wireless device and an interface module according to one embodiment of the present invention are explained in detail with reference to the drawings.

Figure 1:
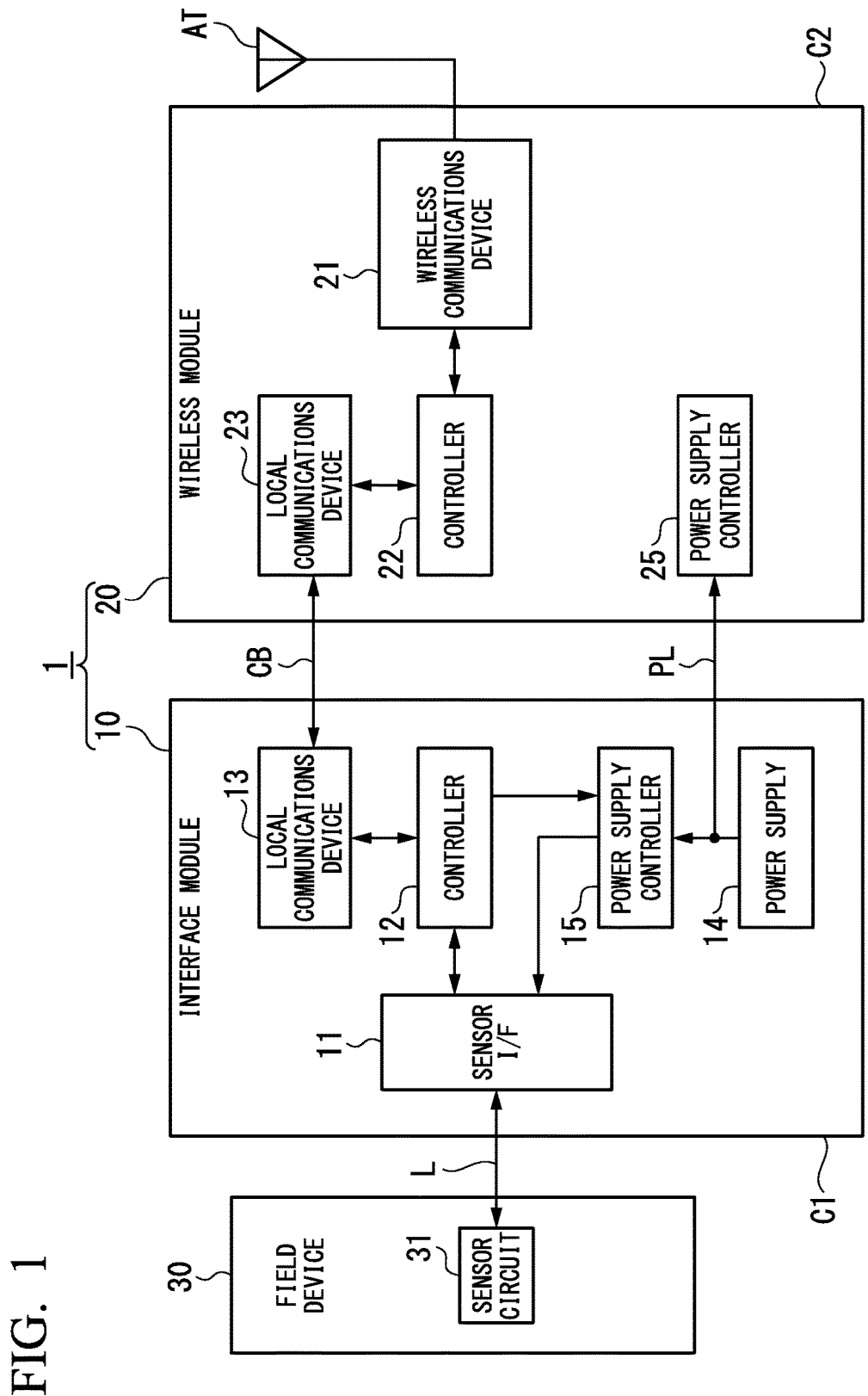
FIG. 1 is a block diagram illustrating a configuration of major parts of a wireless device according to one embodiment of the present invention.

FIG. 1 is a block diagram illustrating a configuration of major parts of a wireless device 1 according to one embodiment of the present invention. As shown in FIG. 1, the wireless device 1 according to the present embodiment that includes an interface module 10 and a wireless module 20, wirelessly transmits a signal from a field device 30, and wirelessly receives a signal to the field device 30.

Here, the field device 30 is, for example, a sensor device such as a flow meter, a temperature sensor, etc., a valve device such as a flow control valve, an on-off valve, etc., an actuator device such as a fan, motor, etc., an imaging device such as a camera, a video, etc., that images conditions within a plant, a subject, an audio device such as a microphone, speaker, etc., that collects an unusual sound, etc., within a plant, or transmits an alarm, etc., a location detection device which outputs location information of the respective device, a device which is installed in the plant field, etc. For easier understanding, according to the present embodiment, the field device 30 is a sensor device which measures the flow rate of a fluid. Therefore, the field device 30 includes a sensor circuit 31 which is a circuit which measures the flow rate of the fluid.

This field device 30 can be connected to a network or a transmission line (for example, a transmission line used in transmission of a "4-20 mA" signal) which is laid in the plant field, to communicate via the network, etc., by receiving supply of power from the network, etc. More specifically, the field device 30 can communicate using a common communications protocol for the process industry, such as HART (registered trademark), BRAIN, Foundation Fieldbus (registered trademark), PROFIBUS (registered trademark), DeviceNet (registered trademark), CC-Link (registered trademark), EtherNet/IP (registered trademark), etc.

The interface module 10, which includes a sensor interface (sensor I/F) 11 (interface), a controller 12 (second controller), a local communications device 13 (a local communications device, a first local communications device), a power supply 14, and a power supply control device 15, is inserted between the field device 30 and the wireless module 20 to be responsible as an interface to the field device 30. In this interface module 10, the above-described sensor interface 11 to the power supply control device 15 are housed in a box-shaped housing C1 (first housing) which fulfills explosive standards.

The sensor interface 11 (interface) is connected to the field device 30 via a connection line L and supplies power from the power supply control device 15 via the connection line L to the field device 30 and conducts communications (analog communications or digital communications) with the field device 30 via the connection line L. In this sensor interface 11 is implemented a communications protocol which is the same as the communications protocol implemented in the field device 30. As the above-described connection line L, the transmission line which is used in transmission of a "4-20 mA" signal, for example, may be used.

More specifically, the sensor interface 11 outputs a signal from the field device 30 obtained by communications via the connection line L (for example, a signal which indicates the flow rate measured by a sensor circuit 31: a first signal) to the controller 12. Moreover, a signal to the field device 30 that is output from the controller 12 (for example, a signal which sets the measurement range of the sensor circuit 31 and a signal destined for the field device 30 that is received by the wireless module 20: a second signal) is transmitted to the field device 30 by communications via the connection line L.

The controller 12 (second controller) controls and manages the operation of the interface module 10. More specifically, the controller 12 controls the sensor interface 11 to cause a signal (to be obtained from the field device 30 and cause the field device 30 to transmit a signal (second signal destined for the field device 30) output from the local communications network 13 to the field device 30. Moreover, the controller 12 controls the local communications device 13 to cause the wireless module 20 to transmit a signal (first signal) from the field device 30 obtained by controlling the sensor interface 11.

Moreover, to reduce consumption of the power supply 14, the controller 12 controls the respective devices of the interface module 10 to cause them to perform a power saving operation. For example, when a wakeup interruption signal (third signal for causing the interface to be brought to the active state) is input from the wireless module 20, the sensor interface 11 is brought to an active state (an operation state), while, when a pre-specified process is completed (for example, when a first signal output from the field device is accepted), the sensor interface 11 is brought to a sleep state (a non-operation state).

Here, the controller 12 and the local communications device 13 are also brought to an active state when the wakeup interruption signal is input from the wireless module 20, while, when the pre-specified process is completed, the controller 12 and the local communications device 13 may be brought to a power-saving state (a standby state, etc.)

after the controller 12 performs a control to bring the sensor interface 11 to the sleep state. The controller 12 can also output a wakeup interruption signal to the wireless module 20 in the sleep state to set the wireless module 20 out of the sleep state. (For example, a case in which a first signal is transmitted from a first local reporting device to a second local reporting device, etc.) In this case, the wireless module wirelessly transmits a signal received from the local communications device 13 by a local communications device 23 to a first external device when the wireless module 20 is set out of the sleep state by the controller 12.

The local communications device 13 (first local communications device) conducts local communications with the local communications device 23, which is provided in the wireless module 20, under the control of the controller 12. For example, the local communications device 13, which includes an infrared communications circuit for conducting communications using infrared light and a wireless communications circuit for conducting near field communication, etc., conducts local communications with the local communications device 23 in a non-contact manner. Alternatively, the local communications device 13, which is connected to the local communications device 23 by a cable CB (a second connection) such as a serial cable, an Ethernet (registered trademark) cable, an optical cable, an USB (universal serial bus) cable, an instrumentation cable, etc., conducts local communications with the local communications device 23 by wired communications via the cable CB. According to the present embodiment, to facilitate understanding, the local communication device 13 conducts local communication via the cable CB.

The power supply 14 includes a power generation circuit, etc., which performs a battery (for example, a primary battery or a secondary battery whose self-discharge is quite small, such as a lithium thionyl chloride battery), a fuel cell, a capacitor, or environmental power generation (the so-called energy harvest such as a solar battery, etc.), supplies power for operating the field device 30, the interface module 10, and the wireless module 20. While the battery 14 is explained with a case accommodated in a housing C1 of the interface module 10 according to the present embodiment, the battery 14 may be arranged in the exterior of the housing C1. When the power supply 14 is arranged in the exterior of the housing C1, the power supply 14 is connected to a power supply terminal (not shown) provided in the housing C1 of the interface module 10.

Using power from the power supply 14, the power supply control device 15 supplies the field device 30, and the respective devices of the interface module 10. Under the control of the controller 12, to decrease consumption of the power supply 14, the power supply control device 15 controls both whether power is supplied to the respective devices of the interface module 10 and whether power is supplied to the field device 30.

The wireless module 20, which includes an antenna AT, a wireless communications device 21, a controller 22 (first controller), a local communications device 23 (a second local communications device), and a power supply control device 25, wirelessly transmits a signal (first signal) from the interface module 10 to an external device (a first external device) and wirelessly receives a signal (a second signal destined for the field device 30) transmitted from an external device (a second external device; the second external device may be the same as the first external device or different from the first external device) to output the received signal to the interface module 10. In this wireless module 20, the above-described configuration (the wireless communication device 21, the controller 22, the local communications device 23, and the power supply control device 25) is accommodated in a housing C2 (a second housing) of a box shape which fulfills explosive standards.

Here, the interface module 10 and the wireless module 20 are connected via the above-described cable CB (a second connection device) and are also connected via a power supply line PL (a first connection device) and. This power supply line PL is for supplying power of the power supply 14 provided in the interface module 10 to the power supply control device 25 provided in the wireless module 20.

The antenna AT, which is provided external to the housing C2, is connected to the wireless communications device 21 to transmit and receive a wireless signal. The antenna AT may be embedded in the housing C2 when the housing C2 does not shield the wireless signal. The wireless communications device 21 conducts wireless communications which is compliant with ISA100.11a under the control of the controller 22. More specifically, the wireless communications device 21 wirelessly transmits a signal output from the controller 22 (a first signal from the interface module 10) and wirelessly receives a signal (a signal destined for the field device 30) transmitted from the external device (the second external device) to output to the controller 22.

The controller 22 (first controller) controls and manages the operation of the wireless module 20. More specifically, the controller 22 wirelessly transmits a signal output from the local communications device 23 by controlling the wireless communications device 21 (a first signal from the interface module 10) and obtains a signal output from the wireless communications device 21 (a second signal destined for the field device 30). Moreover, the controller 22 controls the local communication device 23 to cause the interface module 10 to transmit a signal (a second signal destined for the field device 30) out from the wireless communications device 21.

Moreover, to decrease consumption of the power supply 14 provided in the interface module 10, the controller 22 controls the respective devices of the wireless module 20 to perform power saving operations. For example, when a wakeup interruption signal from the interface module 10 is input, it performs a control to bring the wireless communications device 21 to an active state (an operation state), while, when a pre-specified process is completed (for example, when the first signal is wirelessly transmitted to the first external device, etc.), it performs a control to bring the wireless communications device 21 to a sleep state (a non-operation state).

Here, it may be arranged such that, when the wakeup interruption signal from the interface module 10 is input, the controller 22 and the local communications device 23 are also activated, and, when the pre-specified process is completed (for example, when the first signal is wirelessly transmitted to the first device), the controller 22 and the local communications device 23 may be brought to a power-saving state (a standby state, etc.) after performing a control in which the controller 22 brings the wireless communications device 21 to a sleep state. The controller 22 can also output a wakeup interruption signal to the interface module 10 in a sleep state to set the interface module 10 out of the sleep state (for example, when a second signal wirelessly received from second device is transmitted by the second local communications from the second local communications device to the first local communications device, etc.) In this case, when the interface module 10 is set out of the sleep state by the controller 22, the interface module 10 performs supplying of power to the field device 30 to communicate with the field device 30.

Under the control of the controller 22, the local communications device 23 (a second local communications device) conducts local communications with the local communications device 13 which is provided in the interface module 10. More specifically, the local communications device 23 conducts local communications via the cable CB. When the local communications device 13 which is provided in the interface module 10 is arranged to conduct local communications with non-contact communications such as infrared communications, near-field communications, etc., a device which conducts local communications with non-contact communications such as infrared communications, near-field communications, etc., is also used for the local communications device 23.

The power supply control device 25 supplies power to the respective devices of the wireless module 20 using power supplied via a power supply line PL from the power supply 14 of the interface module 10. Under the control of the controller 22, the power supply control device 25 controls whether to supply power to the respective device of the wireless module 20 to decrease consumption of the power supply 14.

Next, an operation of the wireless device 1 in the above-described configuration is described. Below, an operation which responds to a command transmitted from a control apparatus 40 (see FIGS. 2-5) which conducts a control of the field device 30 (a command response operation); an operation in which the wireless device 1 causes the field device 30 to conduct measurement periodically to transmit the measurement results to the control apparatus 40 (a first external device, a second external device) (a sensing operation); an operation in which an event which occurred in the field device 30 is reported to the control apparatus 40 (an event notification operation); and a variation of the above-described command response (a variation command response operation) are explained in order.

<Command Response Operation>

Figure 2:
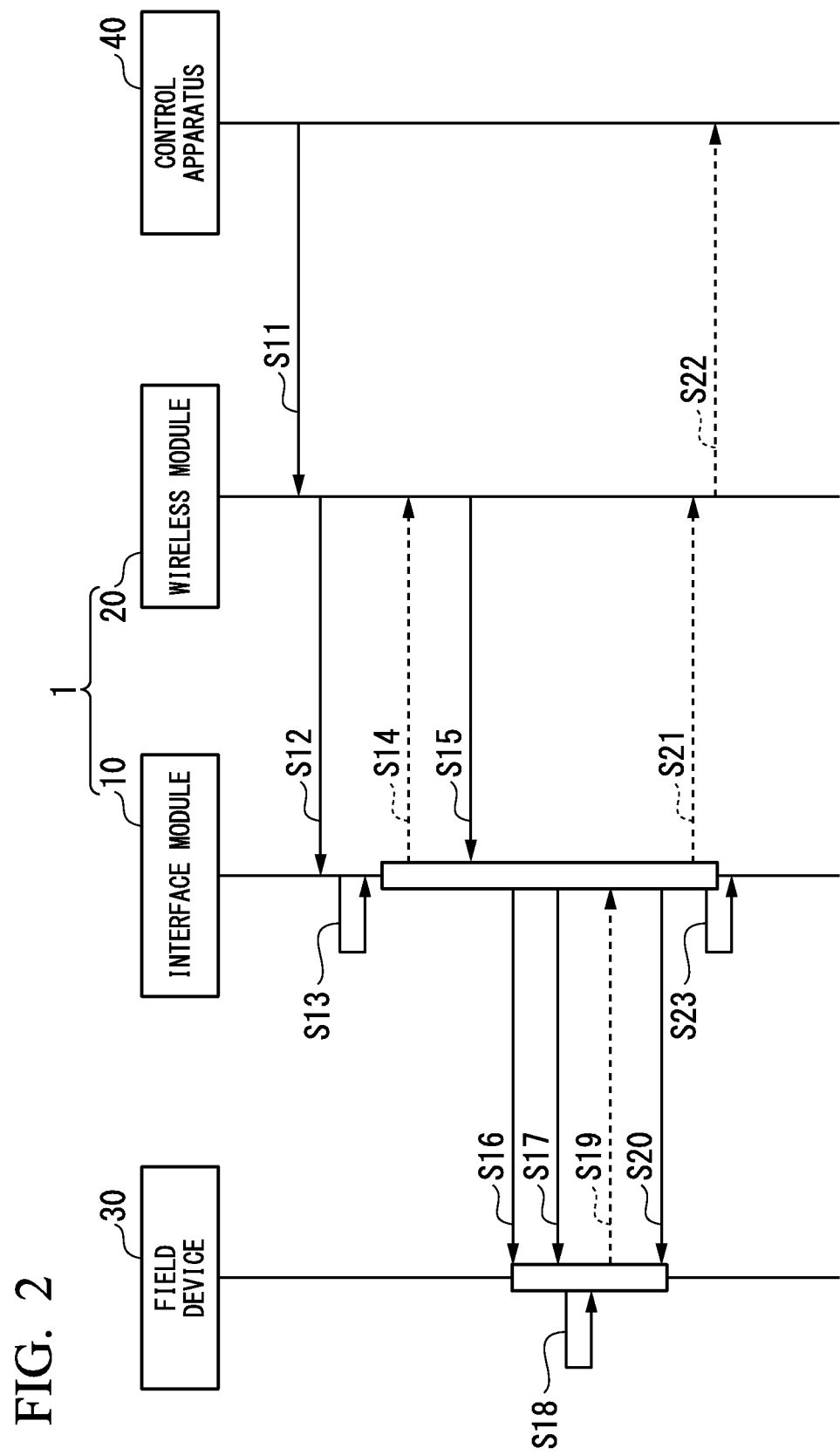
FIG. 2 is a timing chart for explaining a command response operation of the wireless device according to one embodiment of the present invention.

FIG. 2 is a timing chart for explaining a command response operation of the wireless device according to one embodiment of the present invention. In an initial state, the interface module 10 which makes up the wireless device 1 is in a sleep state. More specifically, the sensor interface 11 of the interface module 10 is in the sleep state, while the controller 12 and the local communication device 13 are in a power-saving state, for example. Moreover, in the initial state, power is not supplied from the interface module 10 to the field device 30.

As illustrated in FIG. 2, when a command destined for the field device 30 is transmitted from the control apparatus 40, this command is received in the wireless communications device 21 of the wireless module 20 which makes up the wireless device 1 (step S11).

The command destined for the field device 30 that is transmitted from the control apparatus 40 is a command which indicates a data transmission request to the field device 30, for example. A command received in the wireless communications device 21 of the wireless module 20 is output to the controller 22. Then, a wakeup interruption signal which sets the interface module 10 out of the sleep state is output from the controller 22.

This wakeup interruption signal is transmitted to the interface module 10 via the local communications device 23 and the cable CB (step S12) and input to the controller 12 via the local communications device 13. Then, the local communications device 13 and the controller 12 are set out of the power saving state, and the sensor interface 11 is set out of the sleep state by a control of the controller 12. This causes the interface module 10 to be brought to the wakeup state (step S13).

When the interface module 10 is brought to the wakeup state, a wakeup notification is output from the controller 12. This wakeup notification is transmitted to the wireless module 20 via the local communications device 13 and the cable CB (step S14) and input to the controller 22 via the local communications device 23. Then, the command received in step S11 is output from the controller 22.

The command output from the controller 22 is transmitted to the interface module 10 via the local communications device 23 and the cable CB (step S15) and input to the controller 12 via the local communications device 13. Then, the power supply control device 15 is controlled by the controller 12 and power is supplied to the field device 30 via the sensor interface 11 and the connection line L (step S16). This causes the field device 30 to be brought to the operation state.

When the power is supplied to the field device 30, the command transmitted in step S15 is output from the controller 12 of the interface module 10. This command is transmitted to the field device 30 via the sensor interface 11 and the connection line L (step S17). Then, in the field device 30, a process in response to the command transmitted is performed (step S18). For example, a process is performed of reading a data set for which transmission was requested by a command is read from a memory (not shown) which is provided in the field device 30.

When the process in step S18 is completed, the data set obtained in the process in step S18 is output as a command response from the field device 30. This command response is transmitted to the interface module 10 via the connection line L (step S19) and is input to the controller 12 via the sensor interface 11. Then, the power supply control device 15 is controlled by the controller 12 and supplying of power to the field device 30 is stopped (step S20). This causes the field device 30 to be brought to a stop state.

When the supplying of the power to the field device 30 is stopped, the command response input in step S19 is output from the controller 12. This command response is transmitted to the wireless module 20 via the local communications device 13 and the cable CB (step S21), and is input to the controller 22 via the local communications device 23. Then, the wireless communications device 21 is controlled by the controller 22, and a command response input to the controller 22 is transmitted to the control apparatus 40 (step S22).

When the command response is transmitted from the interface module 10 to the wireless module 20, a control is performed in which the sensor interface 11 is brought to the sleep state and the local communications device 13 is brought to the power saving state by the controller 12 of the interface module 10. When this control is completed, a control is performed by the controller 12 to cause it to be brought to the power saving state. This causes the interface module 10 to be brought to the sleep state (step S23).

<Sensing Operation>

Figure 3:
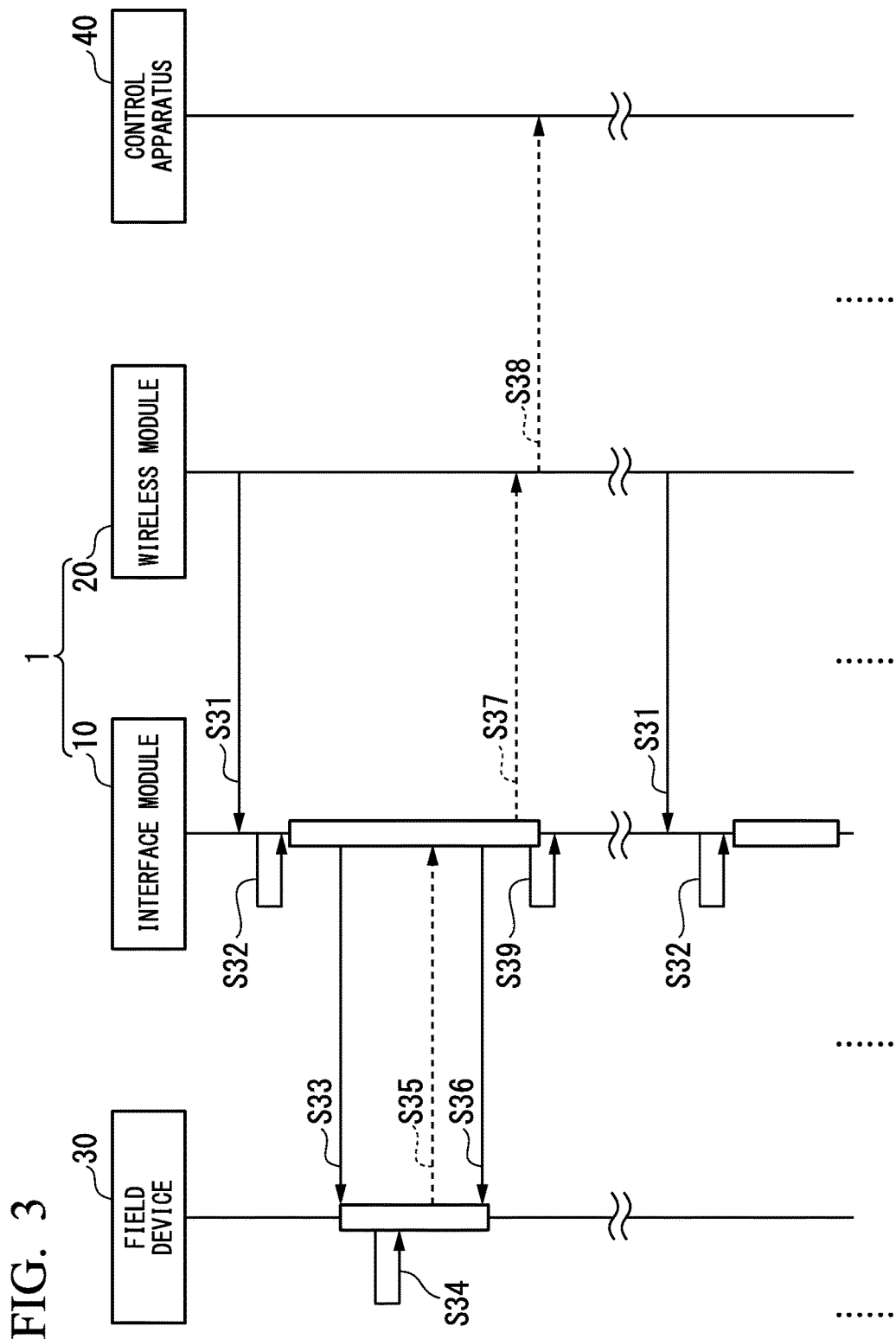
FIG. 3 is a timing chart for explaining a sensing operation of the wireless device according to one embodiment of the present invention.

FIG. 3 is a timing chart for explaining a sensing operation of the wireless device according to one embodiment of the present invention. In the same manner as the above-described "command response operation", in the initial state, the interface module 10 which makes up the wireless device 1 is brought to the sleep state and power is not supplied from the interface module 10 to the field device 30.

In "a sensing operation", the wakeup interruption signal for setting the interface module 10 out of the sleep state is periodically output from the controller 22 of the wireless module 20. The wakeup interruption signal which is output from the controller 22 is transmitted to the interface module 10 via the local communication device 23 and the cable CB (step S31) and is input to the controller 12 via the local communication device 13. Then, the interface module 10 is brought to the wakeup state (step S32).

When the interface module 10 is brought to the wakeup state, the power control device 15 is controlled by the controller 12 to cause power to be supplied to the field device 30 via the sensor interface 11 and the connection line L (step S33). This causes the field device 30 to be brought to the operation state, and sensing (measurement of the flow rate of the fluid) is performed in the sensor circuit 31 of the field device 30 (step S34). When the sensing is completed, the results of measurement thereof are output as sensing results from the sensor circuit 31.

The sensing results that are output from the sensor circuit 31 are transmitted to the interface module 10 via the connection line L (step S35) and are input to the controller 12 via the sensor interface 11. Then, the power supply control device 15 is controlled by the controller 12, and supplying of power to the field device 30 is stopped (step S36). This causes the field device 30 to be brought to a stop state.

When the supplying of power to the field device 30 is stopped, the sensing results input in step S35 are output from the controller 12. The sensing results are transmitted to the wireless module 20 via the local communications device 13 and the cable CB (step S37) and are input to the controller 22 via the local communications device 23. Then, the wireless communications device 21 is controlled by the controller 22, and the sensing results input to the controller 22 are transmitted to the control apparatus 40 (step S38). When the sensing results from the interface module 10 are transmitted to the wireless module 20, a control of the controller 12 of the interface module 10 causes the interface module 10 to be brought to the sleep state (step S39).

Upon elapsing of a predetermined period after the above-described process is completed, the wakeup interruption signal for setting the interface module 10 out of the sleep state is output again from the controller 22 of the wireless module 20 to be transmitted to the interface module 10 (step S31). In this way, the process of steps S31-S39 shown in FIG. 3 is periodically repeated, and measurement results (sensing results) of the field device 30 is periodically transmitted to the control apparatus 40.

<Event Notification Operation>

Figure 4:
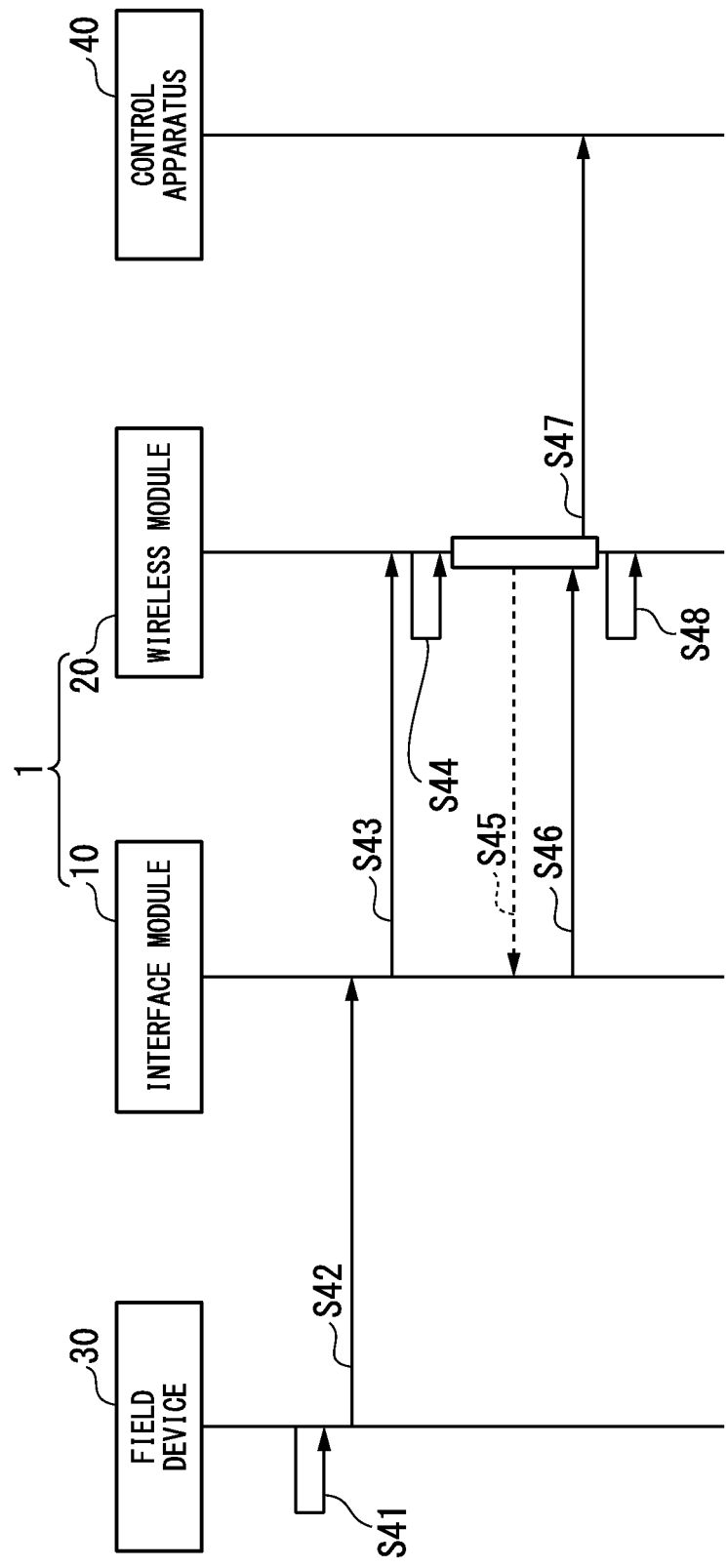
FIG. 4 is a timing chart for explaining an event notification operation of the wireless device according to one embodiment of the present invention.

FIG. 4 is a timing chart for explaining an event notification operation of the wireless device according to one embodiment of the present invention. In an initial state, the wireless module 20 which makes up the wireless device 1 is in the sleep state. More specifically, for example, the wireless communications device 21 of the wireless module 20 is in the sleep state, while the controller 22 and the local communications device 23 are in the power saving state.

As shown in FIG. 4, when some event is detected in the field device 30 (step S41), information indicating the event detected is output from the field device 30 as an event notification. The event notification which is output from the field device 30 is transmitted to the interface module 10 via the connection line L (step S42), and is input to the controller 12 via the sensor interface 11. Then, a wakeup interrupt signal for setting the wireless module 20 out of the sleep state is output.

This wakeup interruption signal is transmitted to the wireless module 20 via the local communications device 13 and the cable CB (step 43) and is input to the controller 22 via the local communications device 23. Then, the local communications device 23 and the controller 22 are set out of the power saving state, and a control of the controller 22 causes the wireless communications device 21 to be set out of the sleep state. This causes the wireless module 20 to be brought to the wakeup state (step S44).

When the wireless module 20 is brought to the wakeup state, a wakeup notification is output from the controller 22. This wakeup notification is transmitted to the interface module 10 via the local communications device 23 and the cable CB (step S45) and input to the controller 12 via the local communication device 13. Then, an event notification output in step S42 is output from the controller 12.

The event notification output from the controller 12 is transmitted to the wireless module 20 via the local communications device 13 and the cable CB (step S46) and is input to the controller 22 via the local communications device 23. Then, the wireless communications device 21 is controlled by the controller 22, and an event notification which is input to the controller 22 is transmitted to the control apparatus 40 (step S47).

When the event notification is transmitted from the wireless module 20 to the control apparatus 40, a control is performed by the controller 22 of the wireless module 20 such that the wireless communications device 21 is brought to the sleep state and the local communications device 23 is brought to the power saving state. When this control is completed, a control is performed by the controller 22 to cause it to be brought to the power saving state. This causes the wireless module 20 to be brought to the sleep state (step S48).

<Variation Command Response Operation>

Figure 5:
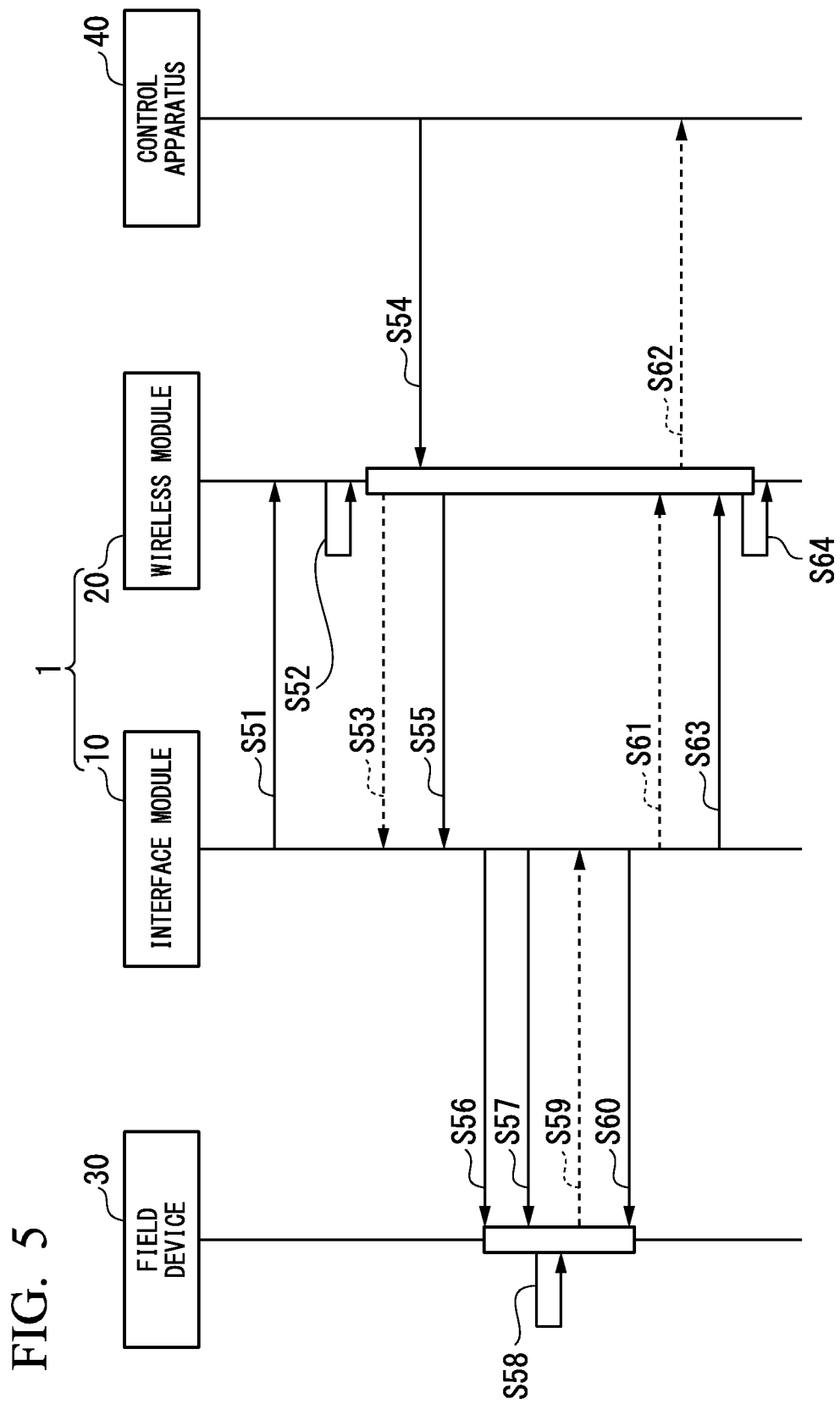
FIG. 5 is a timing chart for explaining a variation command response operation of the wireless device according to one embodiment of the present invention.

FIG. 5 is a timing chart for explaining a variation command response operation of the wireless device according to one embodiment of the present invention. In the "command response operation" explained in FIG. 2, after a command was transmitted from the control apparatus 40, the wireless module 20 wakes up the interface module 10 to cause the command to be transmitted to the field device 30. On the other hand, in the "variation command response operation", schedule information (information indicating a timing at which a command is transmitted by the control apparatus 40 or by an external device) is stored in the interface module 10 and, prior to transmitting the command from the control apparatus 40, the interface module 10 causes the wireless module 20 to wake up in advance to transmit the command from the control apparatus 40 to the field device 30.

In the initial state, in the same manner as the "event notification operation" described using FIG. 4, the wireless module 20 which makes up the wireless device 1 is in the sleep state. More specifically, for example, the wireless communications device 21 of the wireless module 20 is in the sleep state, while the controller 22 and the local communications device 23 are in the power saving state.

In the "variation command response operation", a wakeup interrupt signal for setting the wireless module 20 out of the sleep state is output from the controller 12 of the interface module 10 at the timing in accordance with the above-described schedule information. More specifically, the wakeup interrupt signal is output at the timing previous to a timing at which a command is transmitted from the control apparatus 40 by at least a time required for the wireless module 20 to transfer from the sleep state to the wakeup state.

This wakeup interruption signal is transmitted to the wireless module 20 via the local communications device 13 and the cable CB (step S51), and input to the controller 22 via the local communications device 23. Then, the local communications device 23 and the controller 22 are set out of the power saving state, while the wireless communications device 21 is set out of the sleep state by a control of the controller 22. This causes the wireless module 20 to be brought to the wakeup state (step S52). Subsequently, a wakeup notification is transmitted from the wireless module 20 to the interface module 10 (step S53).

A command destined for the field device 30 is transmitted from the control apparatus 40 at a timing specified in the above-described schedule information. This command is received in the wireless module 20 which makes up the wireless device 1 (step S54). At the time the command from the control apparatus 40 is received, the wireless module 20 is already in the wakeup state. Therefore, the received command is transmitted to the interface module 10 from the wireless module 20 via the cable CB (step S55).

In the same manner as the above-described "command response operation", when the command from the wireless module 20 is received in the interface module 10, supplying of power to the field device 30 via the connection line L (step S56) and transmission of a command to the field device 30 via the connection line L (step S57) are performed in order. Subsequently, in the field device 30, a process is performed in response to the command transmitted in step S57 (step S58).

When the process in step S58 is completed, a data set obtained in the process in step S58 is output as a command response to be transmitted via the interface module 10 via the connection line L (step S59). Then, in the same manner as the above-described "command response operation", supplying of power to the field device 30 is stopped, and the field device 30 is stopped (step S60).

When the supplying of the power to the field device 30 is stopped, a command response obtained in the process in step S59 is transmitted to the wireless module 20 via the cable CB from the interface module 10 (step S61). Then, the command response which is transmitted to the wireless module 20 is transmitted to the control apparatus 40 (step S62).

Upon the transmission of the command from the wireless module 20 to the control apparatus 40, a sleep request for causing the wireless module 20 to be brought to the sleep state is transmitted from the interface module 10 to the wireless module 20 (step S63). When this sleep request is received, in the wireless module 20, a control is performed such that the controller 22 causes the wireless communications device 21 to be brought to the sleep state and the local communication device 23 to be brought to the power saving state, and, then, a control is performed such that the controller 22 causes it to be brought to the controller 22. In this way, the wireless module 20 is brought to the sleep state (step S64).

As described above, in "the variation command response operation", the interface module 10 causes the wireless module 20 to wake up in advance prior to transmission of a command from the control apparatus 40, so that a command transmitted from the control apparatus 40 may be received by the wireless module 20 while realizing power savings. When the command is periodically transmitted from the control apparatus 40, for example, this "variation command response operation" can be realized by storing the transmission period of the command in the interface module 10.

In the above-described "command response operation", "sensing operation", "event notification operation", and "variation command response operation", processes shown in broken lines in FIGS. 2-5 may be omitted. For example, when the field device 30, which may be a valve device, etc., is operated by a control of the control apparatus 40, sensing is not performed, so that a process (step S35, S37, S38) which transmits the sensing results in FIG. 3 is omitted.

As described above, according to the present embodiment, the wireless device 1 is configured to be divided into the interface module 10 which conducts communications with the field device 30 and the wireless module 20 which performs wireless communications. Then, local communications are conducted between the local communications device 13, which is provided in the interface module 10 and the local communications device 23, which is provided in the wireless module 20 to perform transmission and reception of various information sets between the interface module 10 and the wireless module 20.

In this way, when the wireless device 1 is designed, only the interface module 10 may be designed or only the wireless module 20 may be designed, and there is no need to redesign the whole of the device 1 for the respective field device 30, making it possible to reduce development cost or shorten the development period. Moreover, when receiving the wireless standards authentication of the wireless device 1, it suffices to receive only the wireless standards authentication of the wireless module 20, making it possible to reduce the wireless standards authentication as much as possible.

Moreover, replacing the interface module 10 makes it possible to support different field devices 30 with different communications protocols, while replacing the wireless module 20 allows wireless communications which is adapted to various wireless communications standards. Therefore, the respective wireless modules 20 which support ISA100.11a, Wireless HART (registered trademark), and Wi-Fi (registered trademark), for example, can be provided and one interface module 10 which is adapted to the field device 30 can be provided to realize the field device 30 which allows wireless communications which are adopted to the above-described three respective wireless communications standards.

Moreover, arranging the interface module 10 in the vicinity of the field device 30 and the wireless module 20 in the location with good radio wave conditions also can realize stable wireless communications regardless of the location of installing the field device 30. Alternatively, installing the wireless module 20 at a high location (for example, on a rooftop or on a chimney, etc.) to realize stable wireless communications, while installing the interface module 10 at a location to which an operator may easily access makes maintenance such as a battery replacement easy.

Figure 6:
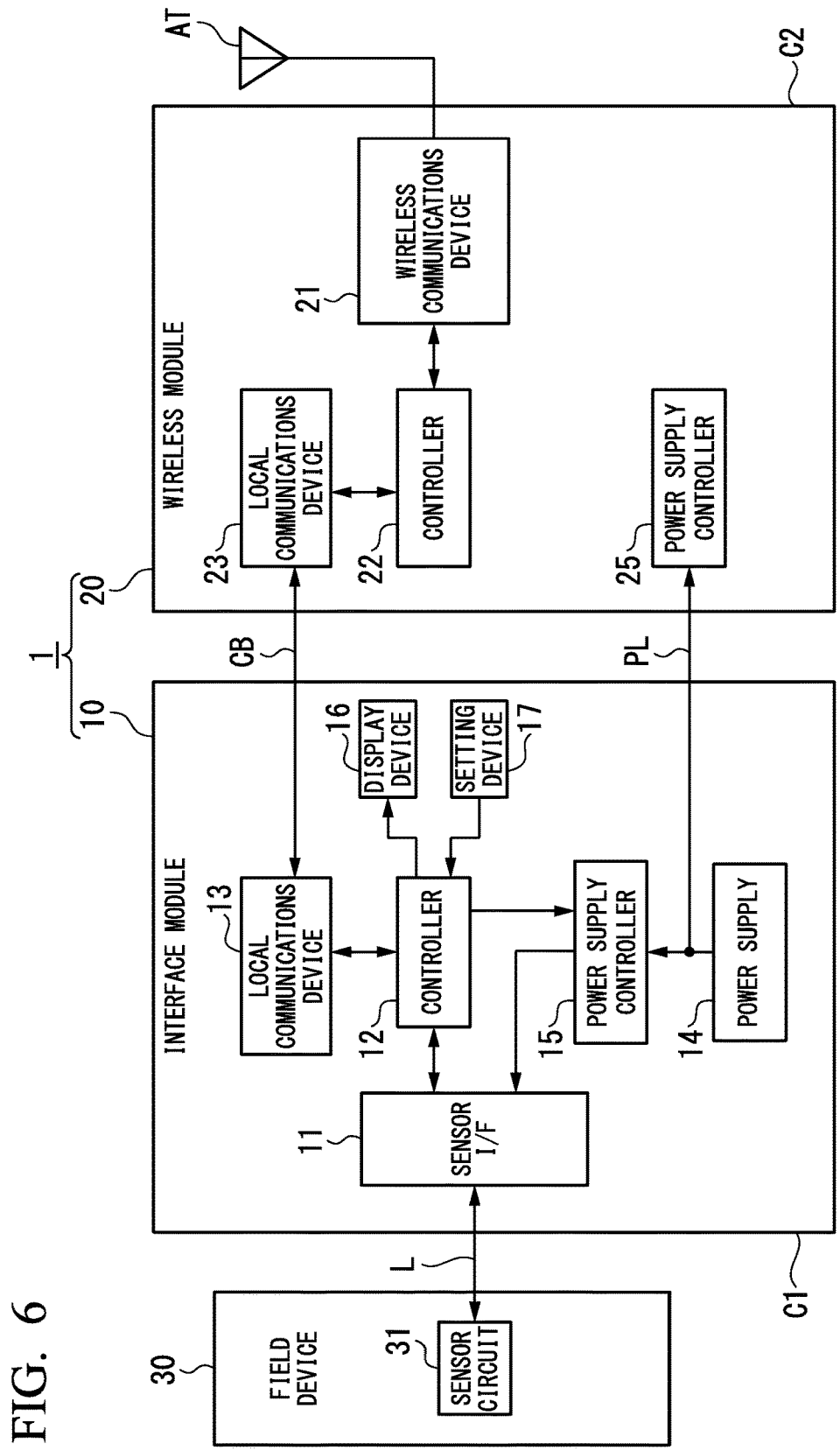
FIG. 6 is a block diagram illustrating a variation wireless device according to one embodiment of the present invention.

FIG. 6 is a block diagram illustrating a variation of the wireless device according to one embodiment of the present invention. While the wireless device 1 which is shown in FIG. 6 is the same as the wireless device 1 shown in FIG. 1 in that it includes the interface module 10 and the wireless module 20, it differs from the wireless device 1 shown in FIG. 1 in that a display device 16 and a setting device 17 are provided in the interface module 10.

The display device 16, which displays the state of the field device 30, the interface module 10, and the wireless module 20, is realized by a liquid crystal display (LCD), a light emitting diode (LED), for example. Information which indicates the state of the field device 30 is obtained by communications between the field device 30 and the interface module 10, while information which indicates the state of the wireless module 20 is obtained by communications between the wireless module 20 and the interface module 10.

The setting device 17 performs various settings to the field device 30, the interface module 10, and the wireless module 20. This setting device 17 includes a switch by which information to be set in the field device 30, etc., is input by an operator operating, etc., a communications apparatus which obtains information to be set to the field device 30, etc., by conducting non-contact communications such as infrared communications, near-field wireless communications, etc. Information on setting the setting device 17 is transmitted to the field device 30 by communications conducted between the field device 30 and the interface module 10, or is transmitted to the wireless communications 20 by communications conducted between the wireless module 20 and the interface module 10.

The display device 16 and setting device 17 may be provided in the wireless module 20 instead of in the interface module 10. Moreover, even when they are provided in the wireless module 10 or in the wireless module 20, it is not necessary for both the display device 16 and the setting device 17 to be provided, so it suffices that only either one of the display device 16 and the setting device 17 is provided.

Figure 7A:
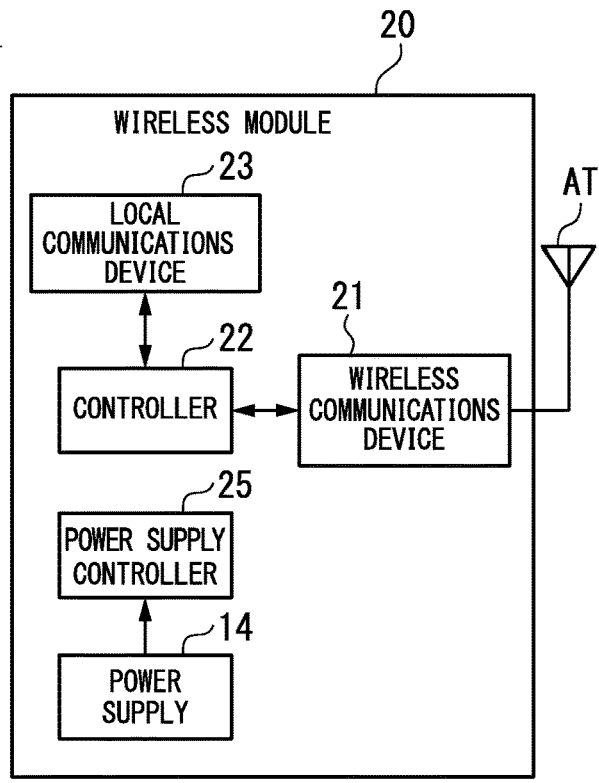
FIG. 7A is a block diagram for explaining a method of using a wireless module included in the wireless device according to one embodiment of the present invention.
Figure 7B:
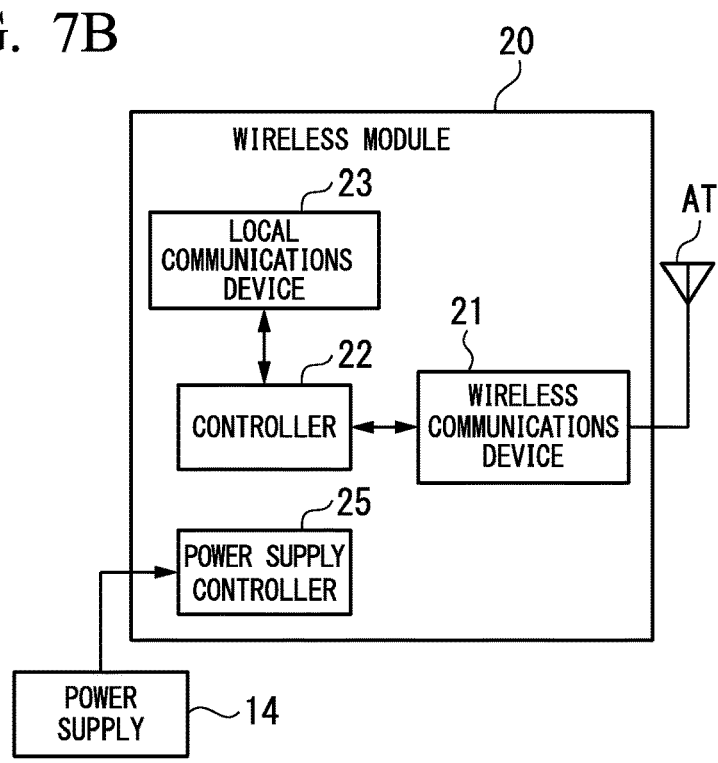
FIG. 7B is a block diagram for explaining a method of using the wireless module included in the wireless device according to one embodiment of the present invention.
Figure 7C:
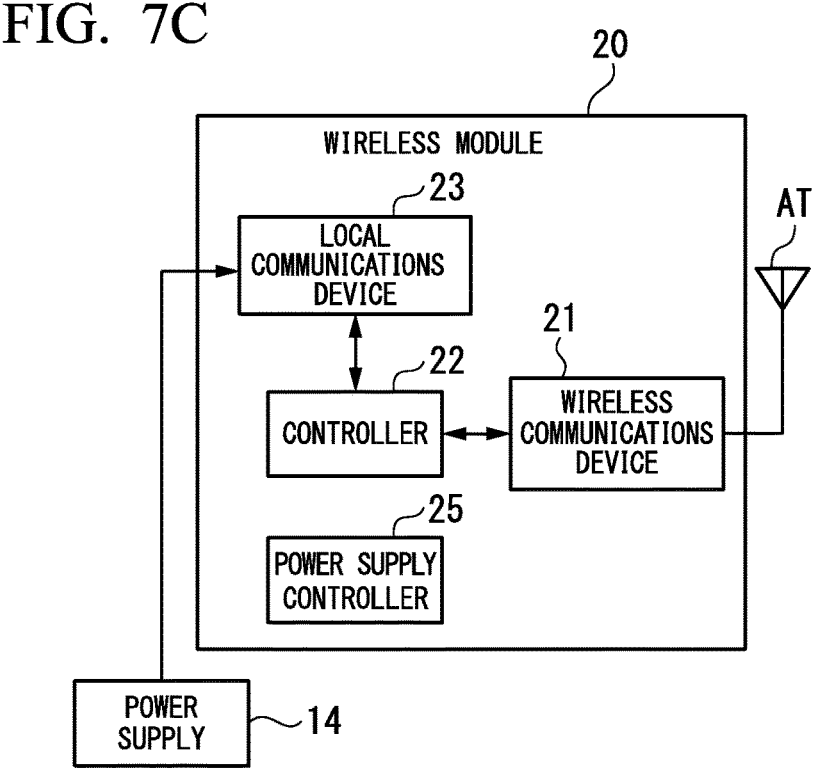
FIG. 7C is a block diagram for explaining a method of using the wireless module included in the wireless device according to one embodiment of the present invention.

FIG. 7A to 7C are block diagrams for explaining a method of using a wireless module included in the wireless device according to one embodiment of the present invention. In the above-described embodiment, to simplify the explanations, it is described that the wireless module 20 wirelessly transmits a signal which passed through the interface module 10 after being output from the field device 30 and wirelessly receives a signal which is transmitted to the field device 30 from the external device.

However, the wireless module 20 can also operate as a single entity as a wireless relay device (a device which wirelessly transmits a received wireless signal without outputting it to the interface module 10). Operating the wireless module 20 as the single entity requires a power supply. Therefore, the power supply 14 may be embedded in the wireless module 20 as shown in FIG. 7A, external to the wireless module 20 to be connected to the power supply control device 25 as shown in FIG. 7B, or external to the wireless module 20 to be connected to the local communications device 23 as shown in FIG. 7C to operate the wireless module 20 as a wireless relay device as a single entity.

While a wireless device and an interface module according to one embodiment of the present invention are described in the foregoing, the present invention may be freely changed within the scope of the present invention without being limited to the above described embodiment. For example, while a case in which supplying of power from the interface module 20 to the field device 30 is performed via the connection line L is explained as an example in the above embodiment, it may be arranged for supplying of power to the field device 30 to be performed via a route different from the connection line L.

Moreover, while an example in which local communications are conducted between the interface module 10 and the wireless module 20 via the cable CB (second connection) and power supplying is performed from the interface module 10 to the communications module 20 via the power supply line PL (first connection) has been described for the above embodiment, both of the above-described local communications and power supplying may be performed via the cable CB. When the power supplying is performed via the cable CB, the power supply line PL may be omitted. When local communications between the local communications devices 12 and 13 are conducted in a non-contact manner, power supplying is performed from the interface module 10 to the communications module 20 via the power supply line PL in the same manner as the above-described embodiment.

Furthermore, while it has been explained for the above-described embodiment that the power supply 14 is provided in the interface module 10, the power supply 14 may be provided in the wireless module 20, or in both the interface module 10 and the wireless module 20. When the power supply 14 is provided in the wireless module 20, the power supply 14 may be stored within a housing C2 or external to the housing C2. When the power supply 14 is provided external to the housing C2, it is connected to the power supply terminal (not shown) which provided to the housing C2 of the wireless module 20.

Moreover, it is not necessarily the case that the features provided in the interface module 10 (the sensor I/F 11 to the power supply controller 15) and the features provided in the wireless module 20 (the wireless communications device 21 to the power supply controller 25) need to be divided as shown in FIG. 1, so that the multiple features may be integrated. For example, the wireless communications device 21 and the controller 22 of the wireless module 20 may be integrated.

Moreover, it is desirable to provide an insulating circuit which meets intrinsically safe explosion proof standards in the interface module 10 and the wireless module 20. For example, for the interface module 10, the insulating circuit may be provided in between the cable CB and the local communications device 13 and at a point connecting the power supply 14 and the power supply power line PL.

Furthermore, explanations are given for the above-described embodiment such that a case in which the interface module 10 and the wireless module 20 are connected by the cable CB and the power supply line PL is provided, they may be electrically connected via contact points (a first connection, a second connection), such as a connector, etc., for example. For example, it may be arranged such that connectors are respectively formed at pre-specified locations in a housing C1 of the interface module 10 and a housing C2 of the wireless module 20, and, when the housings C1 and C2 are fitted in with each other or screwed together, the connector formed in the housing C1 and the connector formed in the housing C2 are electrically connected. The local communications device 13 and the power supply 14 of the interface module 10 and the local communication device 23 and the power supply controller 25 of the wireless module 20 are respectively connected via the connector.

Moreover, in the above-described embodiment, an example has been described in which the power supply controller 25 of the wireless module 20 is connected to the power supply 14 of the interface module 10 via the power supply line PL. However, instead of being connected to the power supply 14, the power controller 25 may be connected via the power control unit 15 via a different power supply line (not shown). This makes it possible to simplify the configuration of the power supply controller 25, for example, or to achieve stabilization of power supplying to the respective devices of the wireless module 20.

Furthermore, while the wireless device 1 has been described in the above-described embodiment as what measures the flow rate of the fluid as a state amount in an industrial process, the present invention may also be applied to wireless device which measures a different state amount (for example, pressure, temperature, etc.). Moreover, while an example of a wireless device which performs wireless communications compliant with ISA100.11a has been described in the above-described embodiment, the present invention may also be applied to a wireless device which conducts wireless communications compliant with Wireless HART (registered trademark), wireless device which conducts wireless communications compliant with Wi-Fi (registered trademark), or also a wireless device which conducts wireless communications compliant with ZigBee (registered trademark).

INDUSTRIAL APPLICABILITY

The present invention may be applied to a wireless device which conducts communications with a field device which is provided in a plant, etc.

EXPLANATION OF REFERENCE

1 Wireless device
10 Interface module
11 Sensor interface (interface)
12 Controller (second controller)
13 Local communications device (first local communications device)
14 Power supply
16 Display device
17 Setting device
20 Wireless module
21 Wireless communications device
22 Controller (first controller)
23 Local communications device (second local communications device)
30 Field device
C1, C2 Housing (first housing, second housing)
CB Cable (second connection)
PL Power supply line (first connection)

The invention claimed is:

1. A wireless device, comprising:
an interface module; and
a wireless module,
wherein the interface module is connected to a field device and includes:
first circuitry configured to at least:
  accept a first signal output from the field device; and
  transmit the first signal to the wireless module by first local communications; and
a first connector, the interface module being attachable to and detachable from the wireless module via the first connector,
wherein the wireless module includes:
second circuitry configured to at least:
  set the interface module out of a sleep state, wherein, when the interface module is set out of the sleep state, the interface module performs supplying of power to the field device to conduct communications with the field device;
  receive the first signal from the interface module by the first local communications; and
  wirelessly transmit the first signal to a first external device; and
a second connector, the wireless module being attachable to and detachable from the interface module via the second connector,
wherein the second circuitry is configured to further:
wirelessly receive a second signal destined for the field device from a second external device; and
transmit the second signal to the interface module by second local communications;
wherein the first circuitry is configured to further output the second signal to the field device;
wherein the first circuitry is configured to further transmit, to the wireless module, a sleep request for bringing the wireless module into the sleep state when the second circuitry transmits a command response to the first external devices, and
wherein when the second circuitry receives the sleep request, the second circuitry is configured to further cause a wireless communication device of the second circuitry into the sleep state, then the second circuitry is configured to further causes the wireless module into a sleep state,
wherein the first circuitry is configured to further set the wireless module out of a sleep state,
wherein, when the wireless module is set out of the sleep state of the wireless module, the second circuitry wirelessly transmits the first signal to the first external device, and
wherein the first circuitry sets the wireless module out of the sleep state prior to the second external device transmitting the second signal using schedule information indicating a timing at which the second external device transmits the second signal.

2. The wireless device as claimed in claim 1, wherein at least one of the interface module and the wireless module includes a power supply which supplies power to at least one of the field device, the interface module, and the wireless module; or a power supply terminal which receives supply of power from the power supply or an external power supply.

3. The wireless device as claimed in claim 2, further comprising:
a first connection which connects the interface module and the wireless module, wherein the power is supplied via the first connection.

4. The wireless device as claimed in claim 2, further comprising:
a second connection which connects the interface module and the wireless module, wherein the first local communications and the second local communications are conducted via the second connection, and
wherein the power is supplied via the second connection.

5. The wireless device as claimed in claim 1, wherein the interface module includes a first housing which accommodates at least the first circuitry; and
wherein the wireless module further includes a second housing which houses at least the second circuitry.

6. The wireless device as claimed in claim 1, wherein either one of the interface module and the wireless module comprises at least one of:
a display device which displays the state of the field device, the interface module, and the wireless module; and
a setting device which performs setting to the field device, the interface module, and the wireless module.

7. The wireless device according to claim 1, wherein the first circuitry in the interface module sets the wireless module out of a sleep state, the second circuitry receives the first signal when the first circuitry sets the wireless module out of the sleep state, and
wherein the second circuitry in the wireless module sets the interface module out of a sleep state, the first circuitry transmits the first signal when the second circuitry sets the interface module out of the sleep state.

8. The wireless device according to claim 7,
wherein the first circuitry receives at least one of an input of data set as a command response and a sensing result from the field device,
wherein
the first circuitry brings at least the first circuitry into a sleep state when the at least one of the command response and the sensing result is transmitted from the interface module to the wireless module.

9. The wireless device according to claim 1,
wherein the first circuitry receives at least one of an input of data set as a command response and a sensing result from the field device,
wherein module
the first circuitry brings at least the first circuitry into a sleep state when the at least one of the command response and the sensing result is transmitted from the interface module to the wireless module.

10. A wireless device, comprising:
an interface module; and
a wireless module,
wherein the interface module is connected to a field device and includes first circuitry configured to at least:
accept a first signal output from the field device; and
transmit the first signal to the wireless module by first local communications,
wherein the wireless module includes second circuitry configured to at least:
receive the first signal from the interface module by the first local communications;
wirelessly transmit the first signal to a first external device;
wirelessly receive a second signal destined for the field device from a second external device; and
transmit the second signal to the interface module by second local communications,
wherein the first circuitry is configured to further output the second signal to the field device,
wherein the first circuitry is configured to further transmit a sleep request to the wireless module,
wherein the second circuitry is configured to further cause the wireless module into a sleep state based on the sleep request received from the interface module,
wherein the first circuitry is configured to further set the wireless module out of the sleep state,
wherein, when the wireless module is set out of the sleep state, the second circuitry wirelessly transmits the first signal to the first external device, and
wherein the first circuitry sets the wireless module out of the sleep state prior to the second external device transmitting the second signal using schedule information indicating a timing at which the second external device transmits the second signal.

11. A wireless device, comprising:
an interface module; and
a wireless module,
wherein the interface module is connected to a field device and includes first circuitry configured to at least:
accept a first signal output from the field device;
transmit the first signal to the wireless module by first local communications; and
control supplying of power to the field device,
wherein the wireless module includes second circuitry configured to at least:
receive the first signal from the interface module by the first local communications;
wirelessly transmit the first signal to a first external device;
wirelessly receive a second signal destined for the field device from a second external device; and
transmit the second signal to the interface module by second local communications,
wherein, when the second circuitry wirelessly receives the second signal from the second external device, the second circuitry sets the interface module out of a sleep state, and then transmits the second signal to the interface module by the second local communications,
when the interface module is set out of a sleep state by the second circuitry and receives the second signal from the wireless module, the first circuitry supplies power to the field device, and then outputs the received second signal to the field device,
when the first circuitry receives at least one of an input of data set as a command response and a sensing result from the field device, the first circuitry stops the supplying of the power to the field device, and then transmits the at least one of the command response and the sensing result to the wireless module,
the second circuit transmits the at least one of the command response and the sensing result to the second external device.

* * * * *